(12) United States Patent
Chiu et al.

(10) Patent No.: US 8,786,558 B2
(45) Date of Patent: Jul. 22, 2014

(54) CONTROL APPARATUS AND CONTROL METHOD FOR CONTROLLING PANEL MODULE INCLUDING TOUCH PANEL AND DISPLAY PANEL BY REFERRING TO LEVEL TRANSITION OF AT LEAST ONE DRIVING SIGNAL

(75) Inventors: Ming-Cheng Chiu, Tainan County (TW); Yi-Long Yang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 351 days.

(21) Appl. No.: 12/691,727

(22) Filed: Jan. 21, 2010

(65) Prior Publication Data

US 2011/0175824 A1 Jul. 21, 2011

(51) Int. Cl.
*G06F 3/041* (2006.01)
(52) U.S. Cl.
CPC ............ *G06F 3/0412* (2013.01); *G06F 3/0418* (2013.01)
USPC ........................................ 345/173; 178/18.02
(58) Field of Classification Search
CPC .............................. G06F 3/0412; G06F 3/0418
USPC ........................................ 345/173; 178/18.02
See application file for complete search history.

(56) References Cited

U.S. PATENT DOCUMENTS

| 4,631,355 | A | * | 12/1986 | Federico et al. | ............ 178/18.06 |
| 5,923,320 | A | * | 7/1999 | Murakami et al. | ............ 345/179 |
| 6,506,983 | B1 | * | 1/2003 | Wilson et al. | ............ 178/18.01 |
| 2003/0058207 | A1 | * | 3/2003 | Washio et al. | ............ 345/87 |
| 2004/0100450 | A1 | * | 5/2004 | Choi | ............ 345/173 |
| 2006/0055680 | A1 | * | 3/2006 | Okazaki | ............ 345/173 |

FOREIGN PATENT DOCUMENTS

TW 200709025 3/2007

* cited by examiner

*Primary Examiner* — Chanh Nguyen
*Assistant Examiner* — John Kirkpatrick
(74) *Attorney, Agent, or Firm* — Winston Hsu; Scott Margo

(57) ABSTRACT

A control apparatus for controlling a panel module including a touch panel and a display panel is provided. The control apparatus includes: a display driver, coupled to the display panel, for controlling display operations of the display panel according to a plurality of driving signals; and a touch controller, coupled to the touch panel and the display driver, for referring to a level transition of at least one driving signal of the driving signals to generate a touch control signal corresponding to a touch sensing output generated by the touch panel.

6 Claims, 3 Drawing Sheets

CONTROL APPARATUS AND CONTROL METHOD FOR CONTROLLING PANEL MODULE INCLUDING TOUCH PANEL AND DISPLAY PANEL BY REFERRING TO LEVEL TRANSITION OF AT LEAST ONE DRIVING SIGNAL

BACKGROUND OF THE INVENTION

1. Field of the Invention

The present invention relates to control of a panel module including a touch panel and a display panel, and more particularly, to a control apparatus for controlling sensing timing corresponding to the sensing operations of the touch panel by referring to signals at the display panel, thereby promotes the sensing precision and the operating speed.

2. Description of the Prior Art

In modern panel techniques, a panel module usually includes a touch panel and a display panel for sensing the touching signals and executing the display operations, respectively. The signals corresponding to the operations of the display panel, such as the driving signals, however, lead to noise coupling betweens the display panel and the touch panel and downgrade the sensing preciseness of touch panel. Please refer to FIG. 1. FIG. 1 is a diagram illustrating noise coupling between a touch panel 110 and a display panel 120. As shown in FIG. 1, the panel module 100 possesses a touch panel 110 and a display panel 120; the signals sent to the display panel 120 would cause noise signals coupled to the touch panel 110 which affect the accuracy of the touch sensing outputs generated by the touch panel 110; the inaccurate touch sensing outputs need to be revised in the subsequent software/hardware processes and this causes additional costs. Moreover, the processes for revising the inaccurate touch sensing outputs also delay the subsequent operations of the touch panel. What is clearly needed are an apparatus and a method that upgrade the sensing preciseness of the touch panel and thereby advance the operations of the touch panel with reduced cost.

SUMMARY OF THE INVENTION

According to a first exemplary embodiment of the present invention, a control apparatus for controlling a panel module including a touch panel and a display panel is provided. The control apparatus includes a display driver and a touch controller. The display driver is coupled to the display panel, for controlling display operations of the display panel according to a plurality of driving signals. The touch controller is coupled to the touch panel and the display driver, for referring to a level transition of at least one driving signal of the driving signals to generate a touch control signal corresponding to a touch sensing output generated by the touch panel.

According to a second exemplary embodiment of the present invention, a control method for controlling a panel module including a touch panel and a display panel is provided. The control method including: providing a display driver coupled to the display panel; using the display driver to control display operations of the display panel according to a plurality of driving signals; providing a touch controller coupled to the touch panel and the display driver; and using the touch controller to refer to a level transition of at least one driving signal of the driving signals to generate a touch control signal corresponding to a touch sensing output generated by the touch panel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

Figure 2:
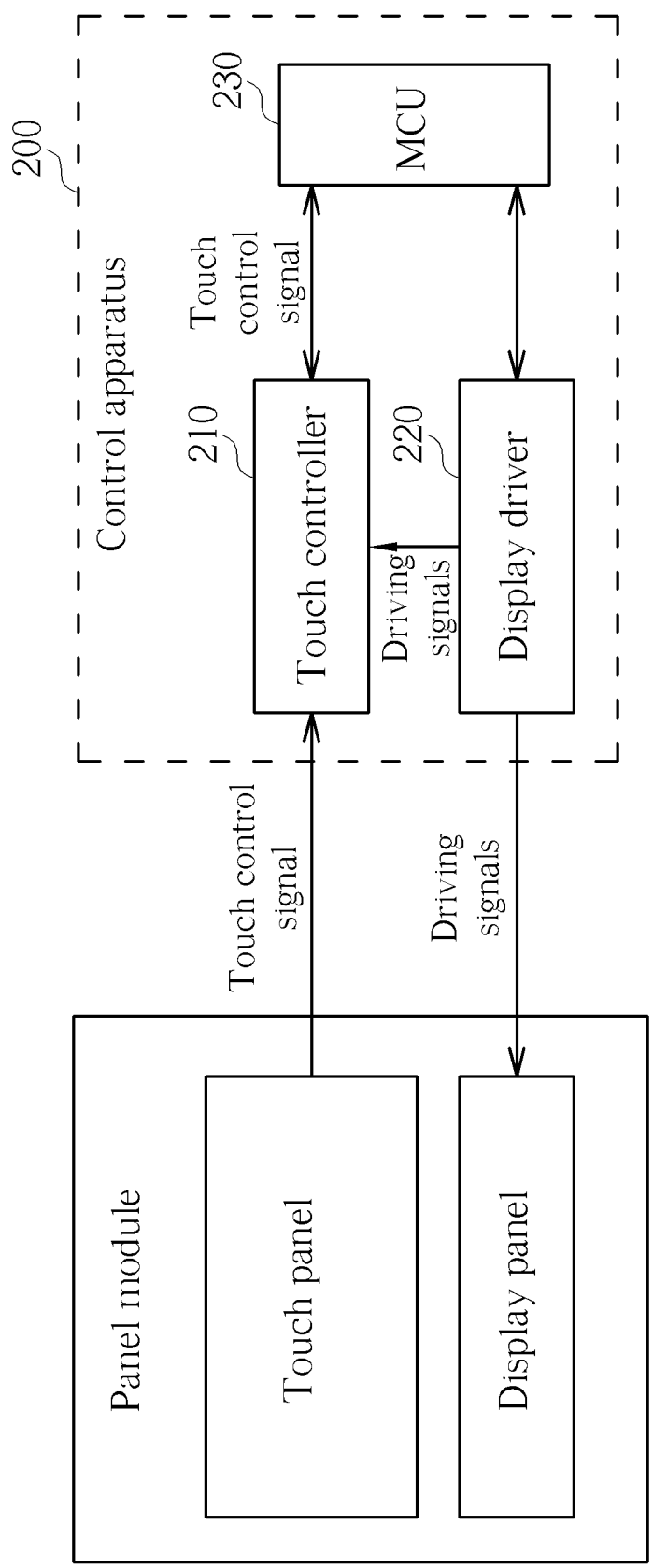
FIG. 2 is a diagram illustrating a control apparatus for controlling a panel module including a touch panel and a display panel according to an exemplary embodiment of the present invention.

Please refer to FIG. 2. FIG. 2 is a diagram illustrating a control apparatus for controlling a panel module including a touch panel and a display panel according to an exemplary embodiment of the present invention. The control apparatus 200 consists of a touch controller 210, a display driver 220 and a micro control unit (MCU) 230. The display driver 220 is coupled to the touch panel and refers to a plurality of driving signals to control the display operations of the display panel. The touch controller 210 is coupled to the touch panel and the display driver 220, and generates a touch control signal corresponding to a touch sensing outputs by referring to the aforementioned driving signals, wherein the touch sensing outputs are signals generated by the touch panel and the driving signals are signals sent to the display panel for the displaying operations. In this way, by executing the sensing operations of the touch panel in a less-noise environment, both the operating efficiency and the signal accuracy are achieved with less cost. Besides, the control apparatus 200 uses the MCU 230 to control the operations of the touch controller 210 and the display driver 220. Since the operations of the MCU 230 are well known by people skilled in this art, further descriptions are omit here for brevity.

Figure 1:
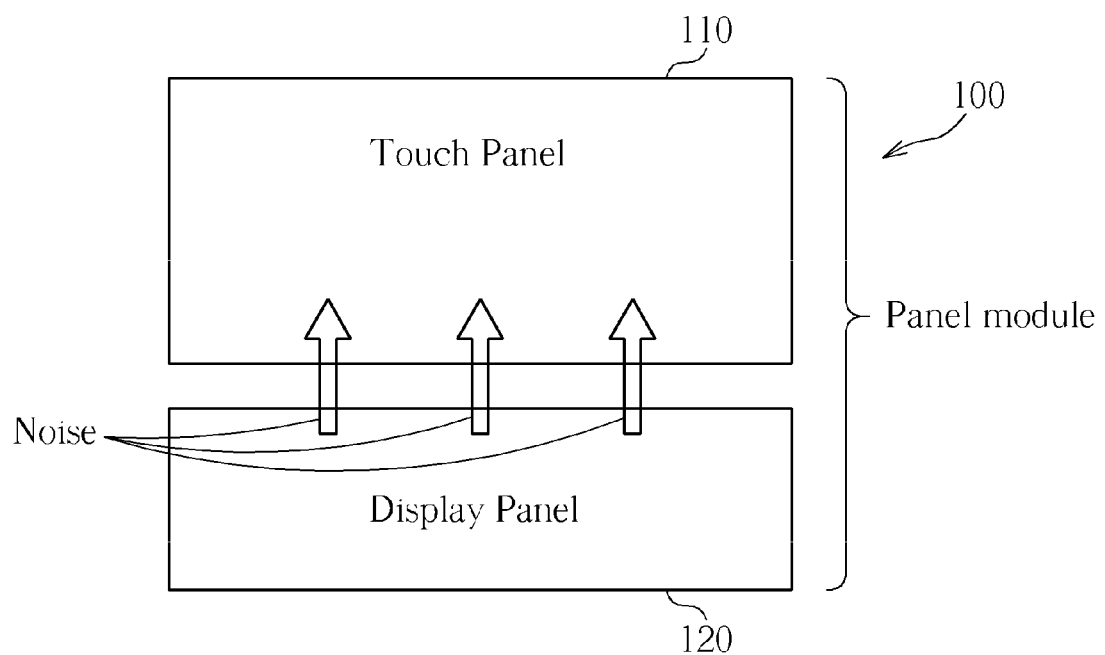
FIG. 1 is a diagram illustrating noise coupling between a touch panel and a display panel.
Figure 3:
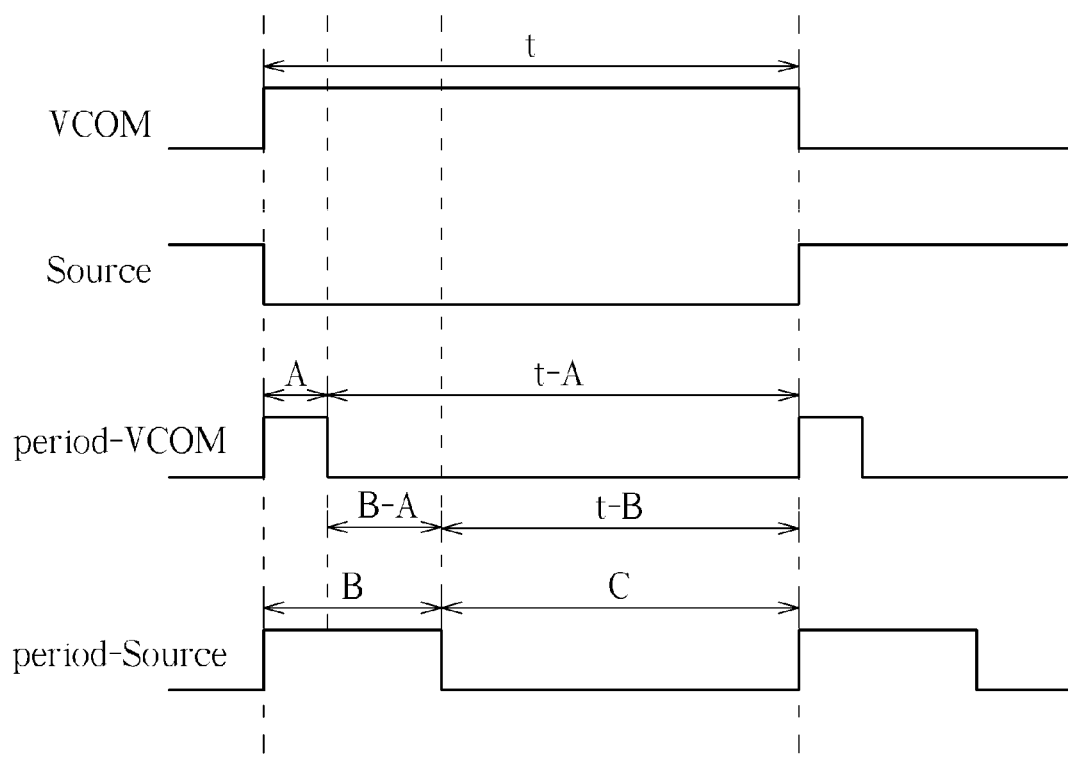
FIG. 3 is a timing diagram of a plurality of signals of the control apparatus of FIG. 1.

Please refer to FIG. 3 in conjunction with FIG. 2. FIG. 3 is a timing diagram of a plurality of signals of the control apparatus of FIG. 1. Since the operations and the processing signals (e.g., driving signals) of the display panel would lead to the unwanted noise coupling between the display panel and the touch panel, and this demotes the preciseness of the generated touch sensing outputs of the touch panel, therefore, to resolve this problem, the touch controller 210 is coupled to the display driver 220, and sets processing periods for sensing the touch panel according to level transition(s) of at least one signal sent between the display driver 220 and the display panel, thereby avoids the generated touch sensing outputs being interfered by the noise coupling. In FIG. 3, the timing diagram exemplary illustrates a first driving signal (e.g., VCOM voltage), a second driving signal (e.g., source signal) and the two driving signals, as well known by people skilled in this art in the displaying operations, are used to generate a gray-level signal according to the voltage difference between the VCOM signal and the source signal. However, the number and type of the signals corresponding to the display panel which are used to be reference for determining the sensing period/sensing timing of the touch panel are not meant to be a limitation of the present invention. With appropriate adjustment, the reference (driving) signals can be other driving signals sent to the display panel/display driver according to the design requirements. For instance, according to different design requirements, a gate signal can also be used as the referenced driving signal. The alternative designs obey and fall into the scope of the present invention. Herein, by referring to the level transitions of the first driving signal (VCOM) and the second driving signal (Source), a first specified signal period-VCOM illustrating the period (e.g., a region "A" in FIG. 3) in which the touch panel is interfered by the first driving signal (VCOM), and a second specified signal period-Source illustrating the period (e.g., a region "B" in FIG. 3) in which the touch panel is interfered by the second driving signal (source) are derived according to the specified driving signals (VCOM and Source). The control apparatus 200 can control the touch controller 210 to determine the processing period for executing the sensing operations of the touch panel according to the reference driving signals and the corresponding specified regions/periods. For instance, supposed that in FIG. 3 a reference period is expressed as t, the control apparatus 200 can control the touch controller 210 to set the processing period being "t-A" when the first driving signal (VCOM) is the major factor for the noise coupling and thereby controls the touch controller 210 only outputting the touch control signal in response to the touch sensing outputs generated by the touch panel during the aforementioned "less-noise" processing period (e.g., "t-A").

Supposed that the main factor for the noise coupling between the display panel and the touch panel is the second driving signal (Source), the control apparatus 200 can control the touch controller 210 to determine a period free from the interfering corresponding to the second driving signal. For example, the touch controller 210 can determine the choose processing period as "t-B" (i.e., herein the time magnitude is identical to that of the time period "C" in FIG. 3), thereby the level transition of the second driving signal (Source) no longer affects the preciseness of the generated touch sensing output in the sensing operation.

When both the reference driving signals (e.g., the first driving signal VCOM and the second driving signal Source) lead to serious noise coupling which affects the accuracy of the sensing operations, the control apparatus 200 can set the touch controller 210 to only output the touch control signal in response to the touch sensing output generated from the touch panel during the processing period "C" which is free from the noise interfering corresponding to the level transitions of both the driving signals. In this way, since the generated touch sensing outputs and the touch control signal is generated in as "less noise" environment, the performance and the efficiency of the whole system is highly promoted.

Furthermore, the control apparatus 200 can also using the weighting scheme to control the touch controller 210 determining the processing period by referring the signals/operations at the display panel/display driver 220. That is, the touch controller 210 can determine the noise regions corresponding to each of the driving signal of the display panel, and, set the processing period accordingly. In an exemplary embodiment, the touch controller 210 divides the processing period into several time segments and sets weighting values for each of the time segments, and generates a touch control signal corresponding to the touch sensing output(s) from the touch panel by referring to the weighting values. For instance, if the first specified region is denoted as A, the second specified region is denoted as B-A, and a region is free from the interference of all the driving signals (e.g., the first driving signal VCOM and the second driving signal Source) is denoted as C, the touch controller 220, the touch controller 210 generates the touch control signal by multiplying each portions of the touch sensing output by the corresponding weighting values. If the weighing value corresponding to the first specified region A, the second specified region B-A and the third specified region C are expressed as α, β and γ respectively and the sensing period here is composed of the specified regions A, B-A and C; the weighted touch control signal generated by the touch controller 210 can be expressed as follows:

$$\text{touch control signal} = \alpha A + \beta(B-A) + \gamma C \qquad (1)$$

In this invention, the control apparatus 200 controls the touch controller 210 to only output the touch control signal in response to the touch sensing output generated by the touch panel during the set processing period, and the touch controller 210 generates the touch control signal according to the touch sensing output and the weighting values.

Since the first specified region "A" and the second specified region "B-A" are the time regions most interfered by the driving signals of the display panel, respectively, in some embodiments, the corresponding weighting values α and β can be set much smaller than the weighting value γ (corresponding to the specified region "C"). In an exemplary embodiment, the weighting values α, β and γ can be set as 0.1, 0.2, and 0.7, respectively.

Furthermore, in other exemplary embodiment, the touch controller 210 can generate the touch control signal according to the specified region(s) and the corresponding weighting factors, so the touch control signal is directly proportional to the weighting factors. In addition, the number and types of the driving signals used to set the processing period for executing the sensing operations are for illustrative purposes only and not meant to be a limitation of the present invention; all the alternative designs obey and fall into the scope of the present invention.

Those skilled in the art will readily observe that numerous modifications and alterations of the device and method may be made while retaining the teachings of the invention.

What is claimed is:

1. A control apparatus for controlling a panel module including a touch panel and a display panel, comprising:
    a display driver, coupled to the display panel, for controlling display operations of the display panel according to a plurality of driving signals; and
    a touch controller, coupled to the touch panel and the display driver, for referring to a level transition of at least one driving signal of the driving signals to generate a touch control signal corresponding to a touch sensing output generated by the touch panel;
    wherein the touch controller divides a processing period, during which the touch sensing output is detected, into at least two time segments that correspond to the level transition of the at least one driving signal, and the touch controller further sets weighting values for each of the at least two time segments, respectively, and generates the touch control signal by multiplying the touch sensing output of each time segment by the corresponding weighting values, wherein the weighting values compensate for interference by the driving signals, and a sum of all of the weighting values is 1.

2. The control apparatus of claim 1, wherein the touch controller refers to a plurality of level transitions respectively corresponding to the driving signals to generate the touch control signal.

3. The control apparatus of claim 1, wherein the plurality of driving signals comprise a VCOM signal and/or a source signal corresponding to the touch panel.

4. A control method for controlling a panel module including a touch panel and a display panel, comprising:
providing a display driver coupled to the display panel;
using the display driver to control display operations of the display panel according to a plurality of driving signals;
providing a touch controller coupled to the touch panel and the display driver; and
using the touch controller to refer to a level transition of at least one driving signal of the driving signals to generate a touch control signal corresponding to a touch sensing output generated by the touch panel;
wherein the step of setting at least a processing period, during which the touch sensing output is detected, comprises using the touch controller to divide the processing period into at least two time segments that correspond to the level transition of the at least one driving signal, and using the touch controller to further set weighting values for each of the at least two time segments, respectively, and to generate the touch control signal by multiplying the touch sensing output of each time segment by the corresponding weighting values, wherein the weighting values compensate for interference by the driving signals, and a sum of all of the weighting values is 1.

5. The control method of claim 4, wherein the step of generating the touch control signal corresponding to the touch sensing output generated by the touch panel touch controller comprises referring to a plurality of level transitions respectively corresponding to the driving signals to generate the touch control signal.

6. The control apparatus of claim 4, wherein the plurality of driving signals comprise a VCOM signal and/or a source signal corresponding to the touch panel.

* * * * *